(12) United States Patent
Zielinski et al.

(10) Patent No.: US 8,224,961 B1
(45) Date of Patent: *Jul. 17, 2012

(54) NETWORK TUNNEL TERMINATION DEVICE SELECTION USING WEIGHTED LOAD BALANCING

(75) Inventors: Margaret Zielinski, Hollis, NH (US); Paul Raison, Windham, NH (US); Paul Howard, Windham, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 529 days.

This patent is subject to a terminal disclaimer.

(21) Appl. No.: 12/191,058

(22) Filed: Aug. 13, 2008

Related U.S. Application Data

(63) Continuation of application No. 10/652,672, filed on Aug. 29, 2003, now Pat. No. 7,487,243.

(51) Int. Cl.
*G06F 15/173* (2006.01)
*G06F 15/16* (2006.01)

(52) U.S. Cl. ......... 709/226; 709/227; 709/228; 709/230

(58) Field of Classification Search .................. 709/203, 709/220, 226–228, 230
See application file for complete search history.

(56) References Cited

U.S. PATENT DOCUMENTS

| | | | |
|---|---|---|---|
| 6,094,437 A * | 7/2000 | Loehndorf et al. | 370/420 |
| 6,704,282 B1 * | 3/2004 | Sun et al. | 370/237 |
| 6,917,592 B1 * | 7/2005 | Ramankutty et al. | 370/237 |
| 6,965,937 B2 * | 11/2005 | Gaddis et al. | 709/227 |
| 7,120,834 B1 * | 10/2006 | Bishara | 714/43 |
| 7,139,276 B1 * | 11/2006 | Sitaraman et al. | 370/401 |
| 7,225,236 B1 * | 5/2007 | Puthiyandyil et al. | 709/218 |
| 2002/0160811 A1 * | 10/2002 | Jannette et al. | 455/560 |
| 2002/0172174 A1 * | 11/2002 | Dick et al. | 370/338 |

OTHER PUBLICATIONS

Townsley, W. et al. "Layer Two Tunneling Protocol L2TP", Network Working Group, Aug. 1999.

* cited by examiner

*Primary Examiner* — J Bret Dennison
*Assistant Examiner* — Steven Nguyen
(74) *Attorney, Agent, or Firm* — Shumaker & Sieffert, P.A.

(57) ABSTRACT

Techniques are described for load balancing subscriber sessions across tunnel termination devices. A network device is described, for example, that includes a tunneling module that load balances subscriber sessions across a plurality of tunnel termination devices based on weightings associated with the tunnel termination devices. The weightings may be assigned to the tunnel termination devices by a user, or may be calculated by the network device based on resource constraints associated with the tunnel termination devices. The network device may calculate the weightings, for example, based on a maximum number of subscriber sessions supported by each of the tunnel termination devices. As one example, the techniques may be applied to load balance Point-to-Point (PPP) subscriber sessions across L2TP Network Servers (LNSs).

21 Claims, 4 Drawing Sheets

NETWORK TUNNEL TERMINATION DEVICE SELECTION USING WEIGHTED LOAD BALANCING

This application is a continuation of U.S. application Ser. No. 10/652,672, filed Aug. 29, 2003, the entire contents of which is incorporated herein by reference.

TECHNICAL FIELD

The invention relates to computing devices and, more particularly, to techniques for selecting devices for terminating network tunnels.

BACKGROUND

The Point-to-Point (PPP) protocol is a network communication protocol specifically designed for connecting a device to a network, such as the Internet. In particular, a subscriber device, such as a home computer, a portable digital assistant (PDA), and the like, may utilize PPP to communicate with an Internet Service Provider (ISP) that provides access to the Internet or other network. The PPP protocol operates within the data link layer of the OSI model and, therefore, is referred to as a layer two protocol.

The Layer Two (2) Tunneling Protocol (L2TP) defines a general-purpose mechanism for tunneling network packets conforming to the Point-to-Point (PPP) protocol over various media. In other words, L2TP defines a mechanism by which datagrams conforming to the PPP protocol are encapsulated within L2TP frames.

In a typical configuration, the subscriber device communicates with an L2TP Access Concentrator (LAC). The LAC is a device attached to the switched network fabric, e.g., PSTN or ISDN, or otherwise co-located with a PPP end system capable of handling the L2TP protocol. The LAC receives the PPP datagrams from the subscriber device, and passes the PPP datagrams to a L2TP Network Server (LNS) via an L2TP tunnel. The LNS, referred to generally herein as a "tunnel termination device," is a layer three device that provides a termination point for the L2TP tunnel. More specifically, the LNS extracts the PPP datagrams encapsulated via the L2TP, and introduces the datagrams to the Internet or other network in packet form. Consequently, each L2TP tunnel is defined by an LNS-LAC pair in which the LNS and the LAC terminate opposite ends of the tunnel. Moreover, the LNS may be viewed as the "server-side" of the L2TP tunnel. Each L2TP session terminated by the LNS is referred to as a "subscriber session."

A typical Internet Service Provider may have multiple LNSs to provide network access for subscriber devices. Upon receiving a network access request from one of the subscriber devices, the LAC typically selects one of the LNSs, and attempts to establish a L2TP tunnel with the selected one of the LNSs. If the attempt fails, the LAC selects a different one of the LNSs and repeats the process. This process continues until either an LT2P tunnel is established and a subscriber session has been established or all of the available LNSs have been tried.

SUMMARY

In general, the invention is directed to techniques for weighted load balancing of subscriber sessions across tunnel termination devices. Weightings may be assigned to the tunnel termination devices by a user, or may be calculated based on resource constraints associated with the tunnel termination devices. As one example, the weightings may be calculated based on a maximum number of subscriber sessions supported by each of the tunnel termination devices. For exemplary purposes, the techniques are described for weighted load balancing Point-to-Point (PPP) subscriber sessions across L2TP Network Servers (LNSs).

In one embodiment, a method comprises selecting one of a plurality of tunnel termination devices based on weightings associated with the tunnel termination devices, and establishing a network tunnel with the selected tunnel termination device.

In another embodiment, a method comprises selecting a set of tunnel termination devices from a plurality of tunnel termination devices based on a preference level, and calculating weightings associated with the tunnel terminations devices of the set based on resource constraints for the tunnel termination devices. The method further comprises selecting one of the tunnel termination devices of the set based on the calculated weightings, and establishing a network tunnel with the selected tunnel termination device.

In another embodiment, a network device comprises a tunneling module that load balances subscriber sessions across a plurality of tunnel termination devices based on a resource constraint associated with the tunnel termination devices.

In another embodiment, a computer-readable medium comprises instructions. The instructions cause a programmable processor to select one of a plurality of tunnel terminations devices based on weightings associated with the plurality of tunnel terminations devices, and establish a network tunnel with the selected tunnel termination device.

The techniques may provide one or more advantages. For example, the use of weighted load-balancing techniques allows the tunnel termination devices to be treated differently during the selection process. As a result, the subscriber loading placed on each of the tunnel termination devices can be allocated based on the available computing resources of the devices. Tunnel termination devices that are able to support a higher number of subscriber sessions, possibly as a result of higher bandwidth, memory, or other resources, will tend to be allocated more of the subscriber sessions as a result of the weighted load balancing. Similarly, tunnel termination devices that are able to support a lower number of subscriber session will be allocated fewer subscriber sessions.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
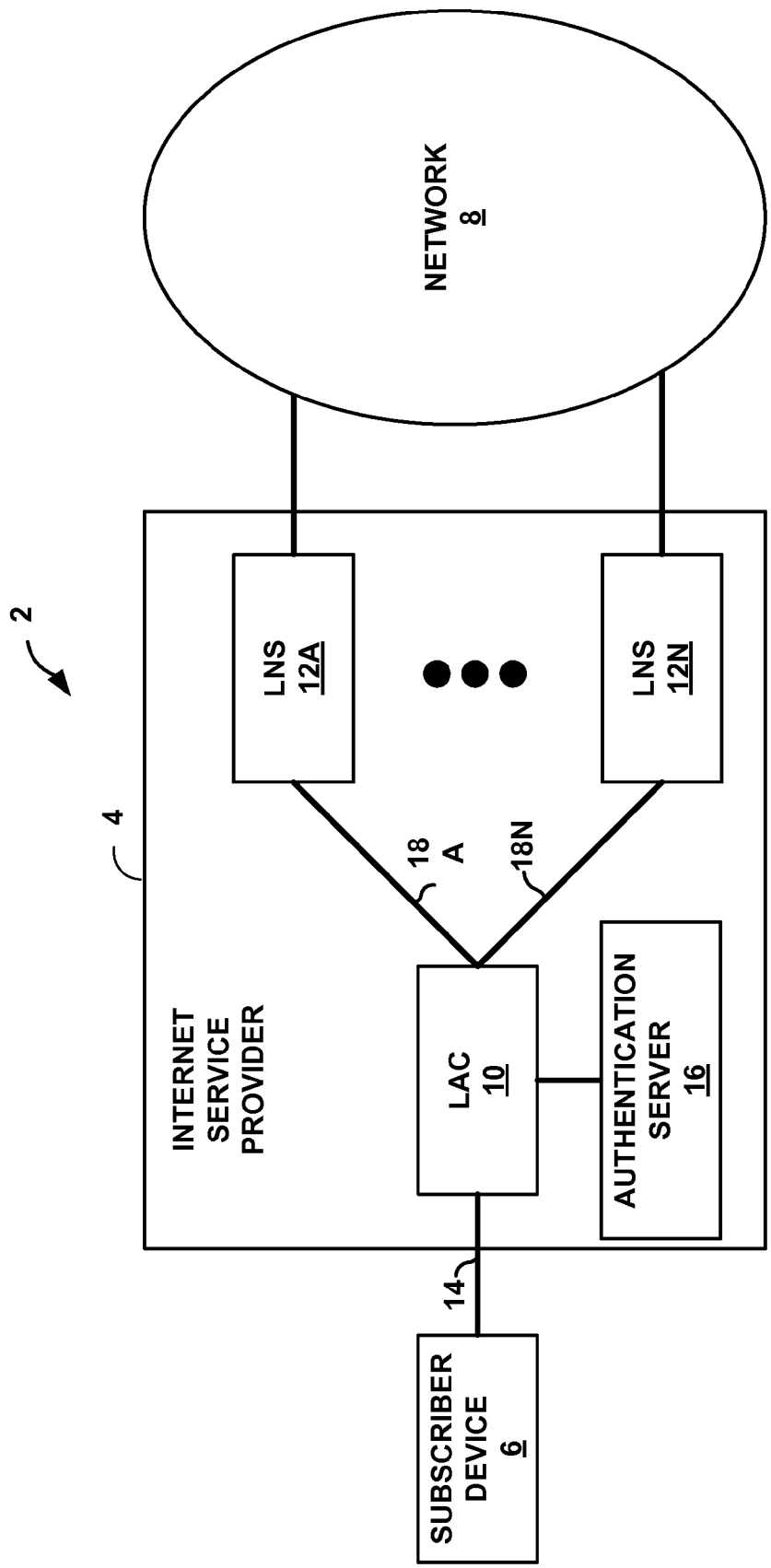
FIG. 1 is a block diagram illustrating an exemplary computing network.

FIG. 1 is a block diagram illustrating an exemplary system 2 in which an Internet Service Provider (ISP) 4 provides a subscriber device 6 with connectivity to network 8. As illustrated, ISP 4 includes an L2TP Access Concentrator (LAC) 10 and a plurality of L2TP Network Servers 12A-12N (collectively "LNSs 12").

Subscriber device 6 utilizes the Point-to-Point (PPP) communication protocol 14 to communicate with LAC 10. For example, using the PPP communication protocol, subscriber device 6 requests access to network 8, and provides user information, such as a username and password. Subscriber device 6 may be, for example, a home computer, a portable digital assistant (PDA), a mobile phone, and the like LAC 10 authenticates the user information. LAC 10 may, for example, internally authenticate the user information, or may forward the user information to authentication server 16.

Upon authenticating the user information, LAC 10 establishes a subscriber session with one of LNSs 12. Specifically, LAC 10 selects one of LNSs 12 as a tunnel termination device, and attempts to establish a Layer Two (2) Tunneling Protocol (L2TP) tunnel 18 with the selected one of LNSs 12. For example, LAC 10 may select LNS 12A and attempt to establish L2TP tunnel 18A. If LAC 10 is unable to establish L2TP tunnel 18A, as described in more detail below, the LAC selects a different one of LNSs 12 and repeats the process. LAC 10 continues this process until either an L2TP tunnel has been successfully established or all LNSs 12 have been tried.

In accordance with the principles of the invention, LAC 10 applies techniques for load balancing subscriber sessions across LNSs 12. More specifically, LAC 10 applies a weighted load-balancing scheme when selecting one of LNSs 12 for terminating the L2TP session associated with the subscriber session. A user, such as a system administrator for ISP 4, may assign weightings to each of LNSs 12. Alternatively, LAC 10 may be configured to automatically calculate the weightings based on resource constraints associated with LNSs 12. As one example, LAC 10 may calculate the weightings based on a maximum number of subscriber sessions that can be supported by each of LNSs 12. Other resource constraints that may be considered include bandwidth, memory, physical location, and the like.

Once LAC 10 has established the subscriber session, e.g., by establishing one of L2TP tunnels 18, the LAC passes PPP datagrams received from subscriber device 6 to the one of LNSs 12 that is operating as the tunnel termination device. For purposes of example, assume that LAC 10 has successfully established L2TP tunnel 18A with LNS 12A. In this case, LAC 10 receives the PPP datagrams via PPP protocol 14, and passes the PPP datagrams to LNS 12A via L2TP tunnel 18A. LNS 12A extracts the PPP datagrams encapsulated within L2TP tunnel 18A, and introduces the PPP datagrams to network 8 in packet form.

Network 8 represents any computer network, and may have a variety of networked resources capable of data communication. For example network 8 may include routers, hubs, gateways, servers, workstations, network printers and faxes, gateways, routers, and the like. Moreover, network 8 may be the Internet or any public or private network.

Although the techniques are described for exemplary purposes in reference to L2TP, the techniques may readily be applied to other tunneling protocols. For example, the techniques may be applied to select a tunnel termination device for terminating any of a Multiprotocol Label Switching (MPLS) tunnel, a Generic Routing Encapsulation (GRE) tunnel, an IP Security (IPSEC) tunnel, and the like.

Figure 2:
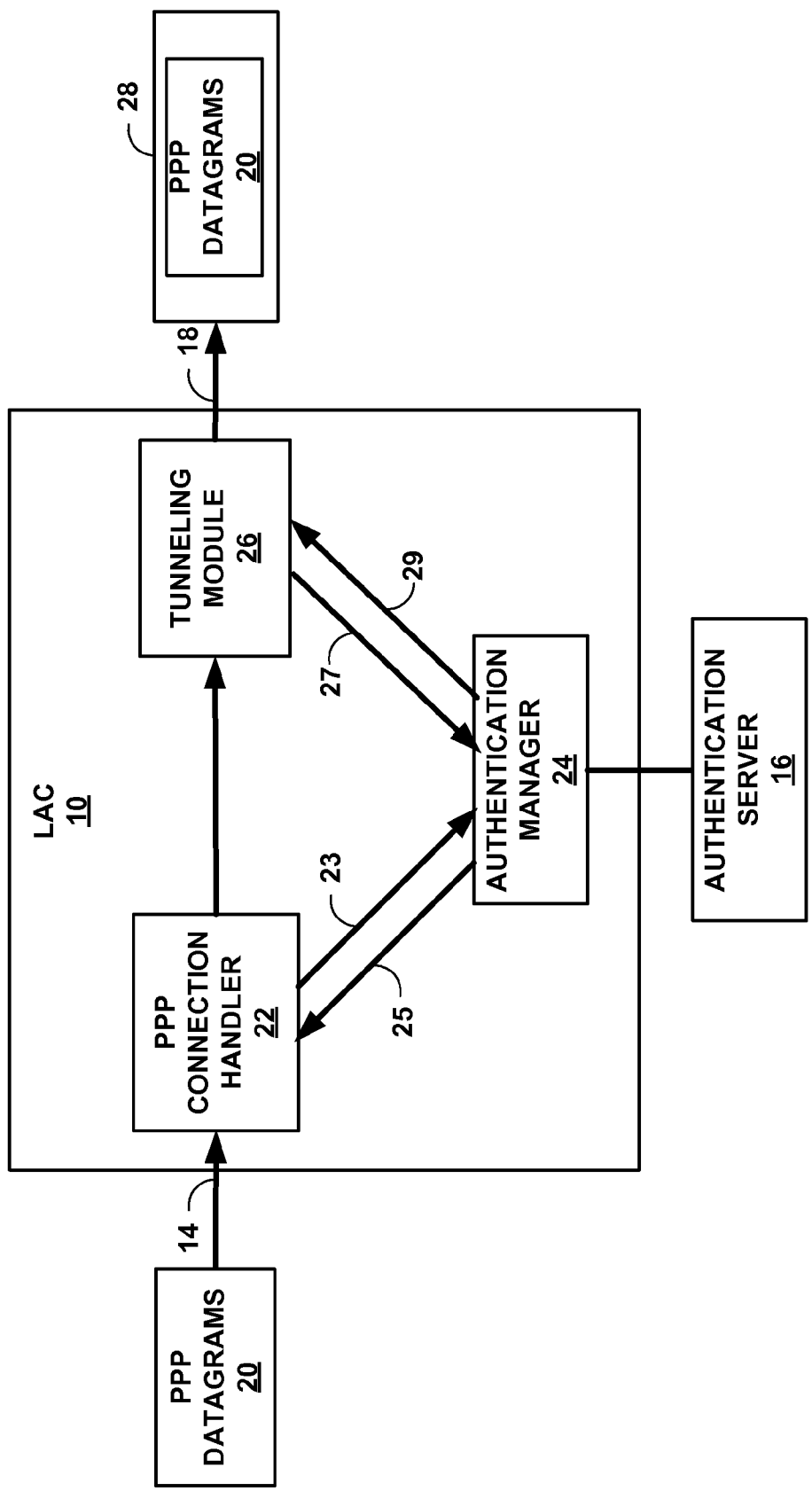
FIG. 2 is a block diagram illustrating an example embodiment of a L2TP Access Concentrator (LAC) consistent with the principles of the invention.

FIG. 2 is a block diagram illustrating an example embodiment of LAC 10 (FIG. 1) in further detail. In the illustrated embodiment, LAC 10 includes a PPP connection handler 22, an authentication manager 24, and a tunneling module 26.

PPP connection handler 22 receives PPP datagrams 20 from subscriber device 6 (FIG. 1) via PPP communication protocol 14. Upon receiving an initial access request, PPP connection handler 22 forwards user information 23 to authentication manager 24 for authentication. Authentication manager 24 authenticates user information 23, possibly by interacting with authentication server 16, and returns a user profile 25 to PPP connection handler 22. User profile 25 may include a variety of information, including an indicator of whether an L2TP tunnel must be formed to handle a subscriber session associated with subscriber device 6.

If an L2TP tunnel must be formed, PPP connection handler 22 invokes tunneling module 26. In response, tunneling module 26 issues a query 27 to authentication manager 24 to retrieve a set of tunnel definitions 29 associated with the respective user information 23. Tunnel definitions 29 define a set of tunnel termination devices, e.g., LNSs 12, with which an L2TP tunnel may be established to support the subscriber session.

Figure 4:
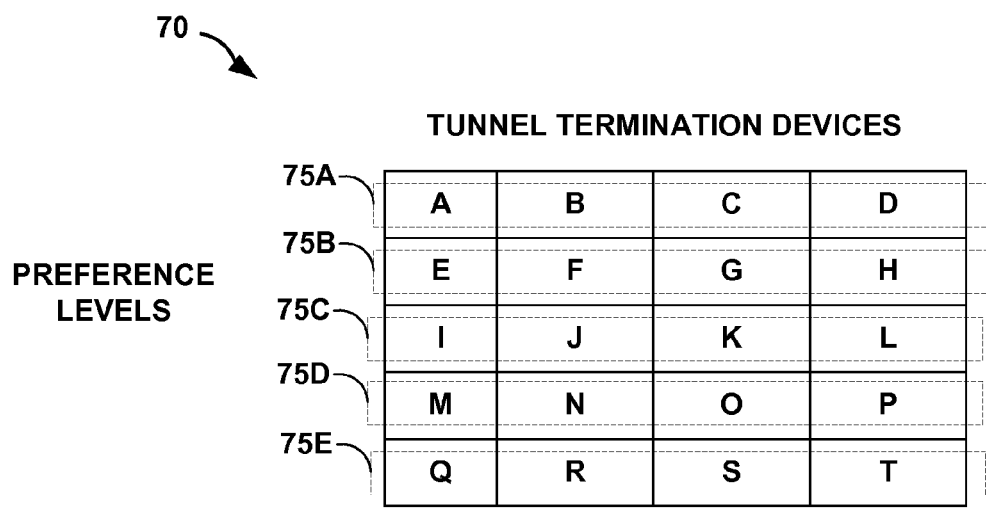
FIG. 4 is a block diagram illustrating an example set of tunnel definitions.

As described in detail in reference to FIG. 4, the tunnel definitions 29 may be arranged according to preference levels. For example, a first subset of the LNSs 12 may be associated with a first preference level. Similarly, a second subset of the LNSs may be associated with a second preference level. Tunneling module 26 makes use of the associated preference levels, at least in part, when attempting to establish L2TP tunnel 18 to support the subscriber session. More specifically, tunneling module 26 applies the weighted load-balancing techniques described herein according to the preference levels associated with the LNSs 12 in order to select one of LNSs 12 to terminate the L2TP tunnel and session. Once the L2TP tunnel and session has been established, tunneling module 26 encapsulates PPP datagrams 20 in the form of L2TP frames 28.

PPP connection handler 22, authentication manager 24, and tunneling module 26 may be implemented as executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. Moreover, the functions of LAC 10 may be implemented by executing the instructions of the computer-readable medium with one or more processors, discrete hardware circuitry, firmware, software executing on a programmable processor, or a combination of any of the above.

Figure 3:
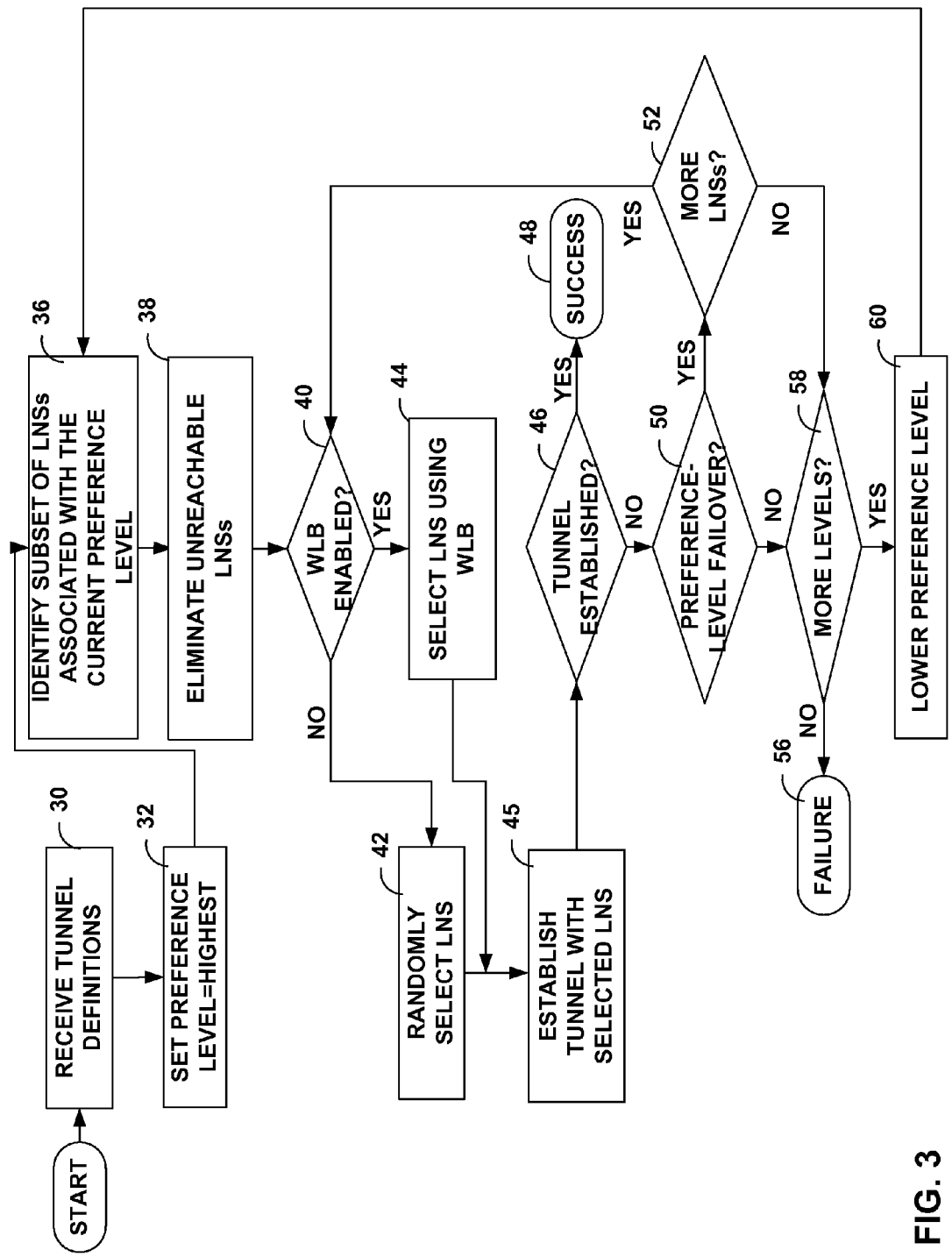
FIG. 3 is a flowchart illustrating exemplary operation of a tunneling module of the LAC of FIG. 2.

FIG. 3 is a flow chart that further illustrates the operation of tunneling module 26 (FIG. 2) in applying the weighted load balancing techniques in accordance with the principles of the invention. Although illustrated for exemplary purposes in reference to L2TP, the techniques are not so limited and may be applied to other tunneling protocols.

As described, tunneling module 26 receives a set of tunnel definitions 29 from authentication manager 24 (30). Tunnel definitions 29 define a set of tunnel termination devices, i.e., LNSs 12, with which an L2TP tunnel may be established. In one embodiment, the tunnel definitions 29 are arranged according to preference levels.

Tunneling module 26 starts with the highest preference level, e.g., by initializing a current preference level variable to the highest preference level (32). Next, tunneling module 26 identifies the subset of LNSs 12 that are associated with the highest preference level (36). Tunneling module 26 then removes from the subset any of LNSs 12 that are unreachable (38). This may be determined based on previously unsuccessful attempts to establish L2TP tunnels.

Tunneling module 26 then determines whether weighted load balancing (WLB in FIG. 3) is enabled (40). WLB may be, for example, a programmable or otherwise configurable option of LAC 10.

If weighted load balancing is not enabled (40), tunneling module 26 randomly selects one of LNSs 12 from the subset (42). If, however, weighted load balancing is enabled, tunneling module 26 applies a weighted load-balancing scheme to select one of LNSs 12 from the subset (44). Tunneling module 26 may utilize weightings that have been assigned to LNSs 12 by a user, such as a system administrator for ISP 4. Alternatively, tunneling module 26 may automatically calculate the weightings based on resource constraints associated with the subset of LNSs 12. As one example, LAC 10 may calculate the weightings based on a maximum number of subscriber sessions supported by each of LNSs 12 of the subset. Other resource constraints that may be considered include bandwidth, memory, physical location, and the like.

Upon selecting one of LNSs 12 from the subset, tunneling module 26 attempts to establish an L2TP tunnel with the selected LNS (45). If the tunnel is successfully established (46), tunneling module 26 terminates the process (48).

If, however, tunneling module 26 is unsuccessful in establishing the L2TP tunnel with the selected one of the subset of LNSs 12, the tunnel module marks the selected LNS as unreachable and determines whether "preference-level" failover is enabled (50). Specifically, tunneling module 26 may examine configuration data and determine whether to attempt to establish an L2TP tunnel with LNSs of the current preference level, or whether to immediately proceed to the next preference level.

If preference-level failover is enabled, tunneling module 26 determines whether there are additional LNSs 12 within the currently identified subset, i.e., whether there are additional LNSs associated with the current preference level (52). If so, tunneling module 26 repeats the process of selecting one of the LNSs of the subset and again attempts to establish an LP2P tunnel.

However, if preference-level failover is not enabled, or if there are no more LNSs 12 associated with the current preference level, tunneling module 26 determines whether there are additional preference levels (58). If so, tunneling module 26 updates the current preference level, e.g., by setting the current preference level to the next highest preference level (60). Tunneling module 26 repeats the process of selecting one of LNSs 12 based on the current preference level, and again attempts to establish an L2TP tunnel with the selected LNS. Tunneling module 26 repeats the process until an L2TP tunnel has been successfully established, or the set of tunnel definitions has been completely processed (56).

FIG. 4 is a block diagrams illustrating an example embodiment of a set of tunnel definitions 70 processed by tunnel module 26 in accordance with the principles of the invention. For exemplary purposes, the set of tunnel definitions 70 has been illustrated in matrix form in which each entry of the matrix corresponds to a possible tunnel termination device, e.g., one of LNSs 12 (FIG. 1). The rows of the matrix represent preference levels, and each row of the matrix defines a subset of the tunnel termination devices associated with the corresponding preference level.

In the illustrated embodiment, the set of tunnel definitions 70 defines tunnel termination devices A-T arranged according to five preference levels 75A-75E. For example, preference level 75A, which is assumed to be the highest preference level for purposes of example, defines tunnel termination devices A-D.

As described above, tunneling module 26 may apply a weighted load-balancing scheme to select one of tunnel termination devices A-D associated with the highest preference level 75A. In one embodiment, tunneling module 26 calculates a respective weighting for each of tunnel termination devices A-D by dividing the respective maximum subscriber sessions supported by each of the tunnel termination devices A-D by the minimum number of subscriber sessions supported on any one of the tunnel termination devices A-D. For example, assume that the tunnel termination devices A-D support maximum subscriber sessions of 500, 1000, 1000, and 500, respectively. In this case, tunnel module 26 calculates a weighting (W) for tunnel termination devices A-D as follows:

$$W_A=500/500=1,$$

$$W_B=1000/500=2,$$

$$W_C=1000/500=2,$$

and $$W_D=500/500=1.$$

Based on the calculated weightings, tunneling module 26 generates a list of possible tunnel termination devices for the current preference level. In particular, each tunnel termination device associated with the current level appears in the list one or more times based on its respective weighting. Tunneling module 26 randomly selects a tunnel termination device from the list, thereby selecting the tunnel termination device in accordance with the calculated weighting.

Figure 5:
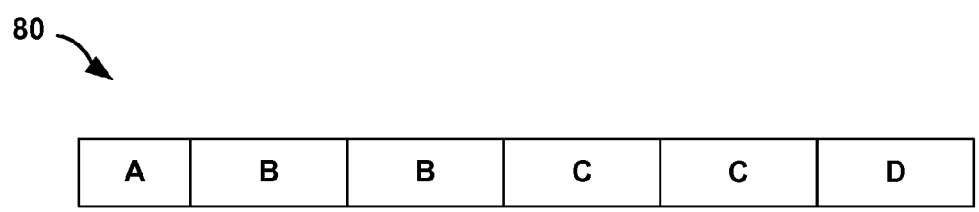
FIG. 5 is a block diagram illustrating an example list of possible tunnel termination devices generated in accordance with the principles of the invention.

FIG. 5 illustrates an exemplary list 80 generated by tunneling module 26 for preference level 75A for the set of tunnel definitions 70 (FIG. 4). In particular, list 80 represents the weighted list of tunnel termination devices A-D based on the exemplary weightings described above.

As illustrated, tunneling module 26 controls the number of times each tunneling destination appears in the lists based on the respective weighting calculated for the tunneling destination. In this example, tunnel termination devices A and D each appear only once in list 80 due to the fact that these tunnel termination devices each support only 500 maximum number of subscriber sessions. In contrast, tunnel termination devices B and C each appear twice in list 80 due to their ability to support a maximum of 1000 subscriber sessions. As a result, list 80 includes six entries.

Upon generating list 80, tunneling module 26 randomly generates a number between one and six, and selects one of tunnel termination devices A-D using the randomly generated number as an index into list 80. In this manner, tunneling module 26 applies the weighted load-balancing techniques to select one of tunnel termination devices A-D associated with the first preference level. If tunneling module 26 is unable to establish a tunnel with the selected one of tunnel termination devices A-D, the tunneling module repeats the process for another tunnel termination device, as described in detail above in reference to FIG. 3.

Various embodiments of the invention have been described. For example, weighted load balancing techniques have been described for distributing PPP subscriber sessions across L2TP Network Servers (LNSs). Although the techniques are described for exemplary purposes in reference to L2TP, the techniques may readily be applied to other tunneling protocols. For example, the techniques may be applied to selection of a tunnel termination device for any of a Multiprotocol Label Switching (MPLS) tunnel, a Generic Routing Encapsulation (GRE) tunnel, an IP Security (IPSEC) tunnel, and the like.

Moreover, the techniques may make use of weightings that have been assigned to the tunnel termination devices by a user, such as a system administrator. Alternatively, or in addition, the weightings may be calculated based on resource constraints associated with the tunnel termination devices. As one example, the weightings may be calculated based on a maximum number of subscriber sessions supported by each of the tunnel termination devices. Other resource constraints that may be considered include bandwidth, memory, physical location, and the like. These and other embodiments are within the scope of the following claims.

The invention claimed is:

1. A method for load-balancing subscriber sessions across a plurality of tunnel termination devices comprising:
    receiving a network access request and user information from a subscriber device;
    authenticating the user information with an access concentrator of a network service provider;
    retrieving tunnel definitions associated with the user information received from the subscriber device, the tunnel definitions defining a plurality of preference levels, wherein each of the plurality of preference levels specifies a different subset of the plurality of tunnel termination devices;
    selecting a highest level of the plurality of preference levels defined by the tunnel definitions;
    selecting one of the plurality of tunnel termination devices from the subset of the plurality of tunnel termination devices associated with the highest level of the plurality of preference levels based on weightings associated with each of the plurality of tunnel termination devices;
    attempting to establish a network tunnel between the selected one of the plurality of tunnel termination devices associated with the highest level of the plurality of preference levels and the access concentrator;
    upon failing to establish the network tunnel with the one of the plurality of tunnel termination devices associated with the highest level of the plurality of preference levels:
        selecting a next highest level of the plurality of preference levels defined by the tunnel definitions;
        selecting one of the plurality of tunnel termination devices associated with the next highest level of the plurality of preference levels from the subset of the plurality of tunnel termination devices specified by the next highest level of the plurality of preference levels based on the weightings associated with each of the plurality of tunnel termination devices associated with the next highest level of the plurality of preference levels; and
        establishing a network tunnel between the one of the plurality of tunnel termination devices associated with the next highest level of the plurality of preference levels and the access concentrator.

2. The method of claim 1, further comprising calculating the weightings associated with each of the plurality of tunnel termination devices based on a resource constraint associated with the each of the plurality of tunnel termination devices associated with a selected preference level.

3. The method of claim 2, wherein calculating the weightings comprises calculating the weightings associated with each of the plurality of tunnel termination devices based on a maximum number of the subscriber sessions supported by the each of the plurality of tunnel termination devices associated with the selected preference level.

4. The method of claim 1, further comprising assigning the weightings associated with each of the plurality of tunnel termination devices to the plurality of tunnel termination devices based on user input.

5. The method of claim 1, further comprising:
    issuing a query to receive the tunnel definitions;
    calculating the weightings associated with each of the plurality of tunnel termination devices for the each of the plurality of tunnel termination devices of a selected preference level; and
    selecting the one of the plurality of tunnel termination devices of the selected preference level based on the weightings associated with each of the plurality of tunnel termination devices calculated.

6. The method of claim 5, wherein calculating the weightings associated with each of the plurality of tunnel termination devices further comprises:
    determining a maximum number of the subscriber sessions supported by the each of the plurality of tunnel termination devices of the selected preference level; and
    calculating the weighting associated with each of the plurality of tunnel termination devices of the selected preference level as a function of the maximum number of the subscriber sessions supported by the each of the plurality of tunnel termination devices of the selected preference level.

7. The method of claim 1, wherein establishing the network tunnel between the one of the plurality of tunnel termination devices associated with the highest level of the plurality of preference levels and the access concentrator comprises establishing the network tunnel between the one of the plurality of tunnel termination devices associated with the highest level of the plurality of preference levels and the access concentrator in accordance with a Layer Two Tunneling Protocol (L2TP).

8. The method of claim 1, wherein establishing the network tunnel between the one of the plurality of tunnel termination devices associated with the highest level of the plurality of preference levels and the access concentrator comprises establishing one of a Multiprotocol Label Switching (MPLS) tunnel, a Generic Routing Encapsulation (GRE) tunnel, and an IP Security (IPSEC) tunnel.

9. The method of claim 1, wherein establishing the network tunnel between the one of the plurality of tunnel termination devices associated with the highest level of the plurality of preference levels and the access concentrator comprises establishing the network tunnel between the one of the plurality of tunnel termination devices associated with the highest level of the plurality of preference levels and the access concentrator from an edge router to the one of the plurality of tunnel termination devices selected.

10. The method of claim 1,
    wherein selecting the one of the plurality of tunnel termination devices comprises selecting one of a plurality of Layer Two Tunneling Protocol (L2TP) Network Servers (LNSs) based on weightings associated with the LNSs, and
    wherein establishing the network tunnel between the one of the plurality of tunnel termination devices associated with the highest level of the plurality of preference levels and the access concentrator comprises establishing an L2TP tunnel with the one of the plurality of LNSs selected.

11. The method of claim 1, further comprising:
calculating the weightings associated with each of the tunnel termination devices specified by the next highest level of the plurality of preference levels based on resource constraints for respective one of the plurality of tunnel termination device,
wherein selecting the one of the plurality of tunnel termination devices associated with the next highest level of the plurality of preference levels is based on the weightings associated with each of the plurality of tunnel termination devices calculated.

12. The method of claim 1, further comprising, upon establishing the network tunnel between the one of the plurality of tunnel termination devices associated with the next highest level of the plurality of preference levels and the access concentrator, establishing a subscriber session associated with the subscriber device over the network tunnel between the one of the plurality of tunnel termination devices associated with the next highest level of the plurality of preference levels and the access concentrator.

13. A network device comprising:
one or more hardware processors;
a connection handler executed by the processors to receive network access requests and user information from subscriber devices;
an authentication handler to authenticate the user information and to receive tunnel definitions associated with the user information received from the subscriber devices that defines a plurality of preference levels, wherein each preference level specifies a subset of a plurality of tunnel termination devices;
a tunneling module executed by the processors to load balance subscriber sessions across the subset of the plurality of tunnel termination devices at a highest level of the plurality of preference levels based on a resource constraint associated with each of the subset of the plurality of tunnel termination devices,
wherein the tunneling module selects one of the plurality of tunnel termination devices associated with the highest level of the plurality of preference levels from the subset of the plurality of tunnel termination devices based on weightings associated with each of the plurality of tunnel termination devices,
and wherein the tunneling module attempts to establish a network tunnel between the one of the plurality of tunnel termination devices associated with the highest level of the plurality of preference levels and an access concentrator of a network service provider;
wherein upon the tunneling module failing to establish the network tunnel with the one of the plurality of tunnel termination devices associated with the highest level of the plurality of preference levels, the tunneling module selects a next highest level of the plurality of preference levels defined by the tunnel definitions, selects one of the plurality of tunnel termination devices associated with the next highest level of the plurality of preference levels from the subset of the plurality of tunnel termination devices specified by the next highest level of the plurality of preference levels based on the weightings associated with each of the plurality of tunnel termination devices associated with the next highest level of the plurality of preference levels, and establishes a network tunnel between the one of the plurality of tunnel termination devices associated with the next highest level of the plurality of preference levels and the access concentrator.

14. The network device of claim 13, wherein the tunneling module load balances the subscriber sessions across the plurality of tunnel termination devices at the highest level of the plurality of preference levels based on a maximum number of the subscriber sessions supported by the each of the tunnel termination devices at the highest level of the plurality of preference levels.

15. The network device of claim 13 wherein the tunneling module calculates the weightings based on a maximum number of subscriber sessions supported by each of the plurality of tunnel termination devices at the highest level of the plurality of preference levels.

16. The network device of claim 13, wherein the tunneling module assigns the weighting associated with each of the plurality of tunnel termination devices for the each of the plurality of tunnel termination devices at the highest level of the plurality of preference levels based on user input.

17. The network device of claim 13, further comprising:
an authorization manager that generates data identifying the plurality of tunnel termination devices and associating the plurality of tunnel termination devices with the plurality of preference levels based on the user information received from the subscriber devices,
wherein the tunneling module load balances the subscriber sessions across the plurality of tunnel termination devices in accordance with the plurality of preference levels associated, identifies the subset of the plurality of tunnel termination devices associated with a current one of the plurality of preference levels, calculates the weightings associated with each of the plurality of tunnel termination devices for the each of the plurality of tunnel termination devices of the subset of the plurality of tunnel termination devices identified, and selects one of the plurality of tunnel termination devices of the subset of the plurality of tunnel termination devices identified based on the weightings associated with each of the plurality of tunnel termination devices calculated.

18. The network device of claim 13, wherein the tunneling module establishes network tunnels with the plurality of tunnel termination devices in accordance with a Layer Two Tunneling Protocol (L2TP).

19. The network device of claim 13, wherein the tunneling module establishes network tunnels with the plurality of tunnel termination devices in accordance with one of Multiprotocol Label Switching (MPLS) protocol, Generic Routing Encapsulation (GRE) protocol, and IP Security (IPSEC) protocol.

20. The network device of claim 13, wherein the network device comprises an edge router, and a tunneling protocol establishes network tunnels from the edge router to the plurality of tunnel termination devices.

21. A non-transitory computer-readable medium comprising instructions to cause a processor to:
receive a network access request and user information from a subscriber device;
authenticate the user information with an access concentrator of a network service provider;
receive tunnel definitions associated with the user information received from the subscriber device that define a plurality of preference levels, wherein each of the plurality of preference levels specifies a subset of a plurality of tunnel termination devices;
select a highest level of the plurality of preference levels based on the user information;
select one of a plurality of tunnel termination devices associated with the highest level of the plurality of preference levels based on weightings associated with each of the plurality of tunnel termination devices;

attempt to establish a network tunnel between the access concentrator and the one of the plurality of tunnel termination devices associated with the highest level of the plurality of preference levels;

upon failing to establish the network tunnel,
- select a next highest level of the plurality of preference levels based on the user information;
- select one of the plurality of tunnel termination devices associated with the next highest level of the plurality of preference levels from the subset of the plurality of tunnel termination devices specified by the next highest level of the plurality of preference levels based on the weightings associated with each of the plurality of tunnel termination devices; and
- establish a network tunnel between the one of the plurality of tunnel termination devices associated with the next highest level of the plurality of preference levels and the access concentrator.

* * * * *